Jan. 31, 1928.

W. O. ROBERTS 1,657,644

TRAP

Filed June 27, 1927

INVENTOR.
William O Roberts
BY Hardway & Cathey
ATTORNEYS.

Patented Jan. 31, 1928.

1,657,644

UNITED STATES PATENT OFFICE.

WILLIAM O. ROBERTS, OF HOUSTON, TEXAS.

TRAP.

Application filed June 27, 1927. Serial No. 201,613.

This invention relates to new and useful improvements in a trap.

One object of the invention is to provide a trap of the character described specially designed for use in trapping roaches and similar vermin.

A further object of the invention is to provide a trap of the character described having an entrant passageway which may be enlarged, or contracted as desired so as to admit certain vermin and exclude others.

With the above and other objects in view this invention has particular relation to certain novel features of construction, arrangement of parts and use, an example of which is given in this specification and illustrated in the accompanying drawings, wherein:—

Figures 1, 2, 3:
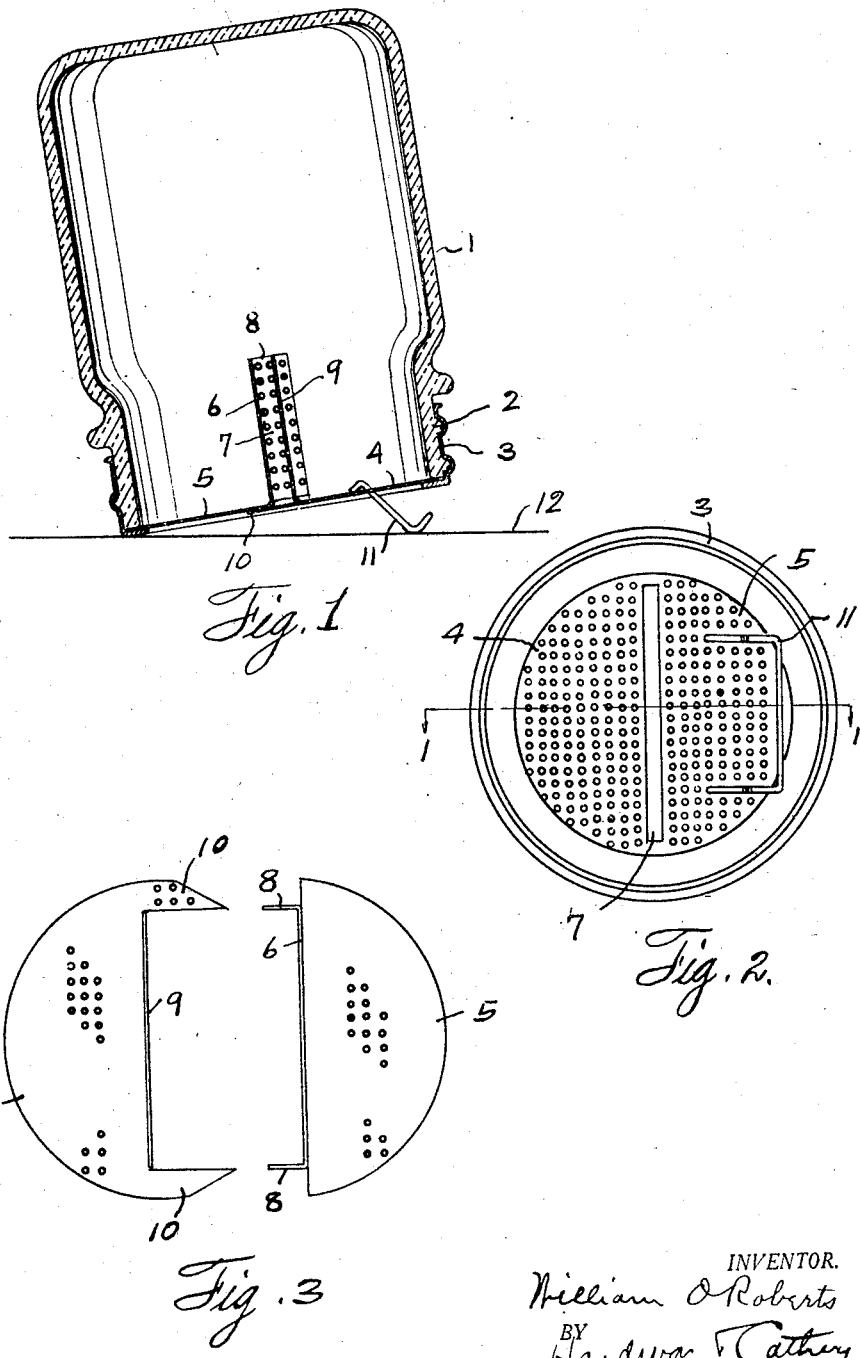
Figure 1 shows a vertical sectional view of the trap, taken on the line 1—1 of Figure 2.
Figure 2 shows a bottom end view.
Figure 3 shows a bottom plan view of the bottom sections of the trap illustrating the method of assembling them.

Referring now more particularly to the drawings, wherein like numerals of reference designate similar parts in each of the figures, the numeral 1 designates a container preferably a glass jar, which has external threads 2, at its open end to receive an annular clamp 3 adapted to be screwed thereon. The open end of the container is spanned by an end plate, preferably foraminated and formed of the sections 4 and 5. The inner margin of the section 5 is inwardly turned forming one side 6 of the entrant passageway 7 and the ends 8, 8, of the inwardly turned portion 6 are overturned at right angles to the side 6, and form the ends of said passageway 7. The section 4 also has an inwardly turned portion 9 opposite and parallel with the inwardly turned portion 6 and forming the opposite side of said passageway and said section 4 has the end projections 10, 10 adapted to fit underneath the section 5 when said sections are assembled, the inwardly turned side 9 being of such length as to fit closely between the overturned ends 8. When the parts are assembled the margin of the foraminated end plate rests against the open end of the container 1 and is clamped against said open end by the clamp 3, as illustrated in Figure 1. At one side of the passageway 7 the foraminated end plate has a U-shaped supporting leg 11 adapted to hold one side of the trap spaced from the floor, or other support 12. A suitable bait is placed on the foraminated end plate within the trap and the roaches, or other vermin may crawl underneath the trap and up through the passageway 7 and reach said bait and once inside of the trap they will not return through said passageway and escape.

When it is desired to vary the size of the passageway 7 the clamp 3 may be partly unscrewed and the plate sections 4 and 5 relatively adjusted to accomplish the desired purpose.

While I have shown what I now consider to be the preferred form of the invention it is obvious that certain mechanical changes may be made therein and equivalents substituted for the parts shown without departing from the principle of the invention and I hereby reserve the right to make such mechanical changes and adaptations as may be found practical so long as I do not depart from the principle of the invention as comprehended within the scope of the appended claims.

What I claim is:—

1. A trap including a container having an open end with an end plate adapted to close said open end, said end plate having an entrant passageway whose walls may be adjusted toward and from each other to vary the size of the passageway, and a supporting leg disposed to hold the entrant end of said passageway clear of the support on which the trap is sustained.

2. A trap including a container, one end of which is formed of sections, said sections having inwardly extending walls which enclose an entrant passageway, said sections being adjustable to vary the size of said passageway and means for detachably securing said end to said container.

3. A trap including a container, one end of which is formed of sections, said sections having inwardly extending walls which enclose an entrant passageway, said sections being adjustable to vary the size of said passageway and a supporting leg adapted to hold said end spaced from the support on which the trap is mounted.

In testimony whereof I have signed my name to this specification.

WILLIAM O. ROBERTS.